Patented Nov. 7, 1939

2,178,829

UNITED STATES PATENT OFFICE 2,178,829

CONDENSATION PRODUCTS

Herman A. Bruson and Clinton W. MacMullen, Philadelphia, Pa., assignors to Röhm & Haas Company, Philadelphia, Pa.

No Drawing. Application February 7, 1938, Serial No. 189,172

12 Claims. (Cl. 260—457)

This invention relates to condensation products obtained by the interaction of aldehydes and sulfonates of aromatic ethers having the general formula R—O—A—X in which R is a sulfonated aromatic radical nuclearly attached to the oxygen atom, A is a divalent aliphatic group containing at least two carbon atoms between O and X, and X is a hydroxy, alkoxy, aryloxy, ester, halogen, sulfuric ester or sulfonic acid group.

It relates further to the process for preparing these products by condensing the sulfonated aromatic ether with an aldehyde in an acid medium.

In carrying out this process we prefer to use formaldehyde or substances which yield formaldehyde such as hexamethylenetetramine, paraformaldehyde, methylal, etc., but we may employ other aldehydes such as acetaldehyde, butyraldehyde, aldol, crotonaldehyde, octyl aldehyde, benzaldehyde, etc., or mixtures of any two or more.

Some typical sulfonated aromatic ethers of the above general formula which may be condensed with the aldehydes enumerated above are the following:

R—O—CH$_2$CH$_2$X

R—O—(CH$_2$)$_n$X ——— n is 2 to 10

R—O—CH$_2$—CH$_2$—O—CH$_2$CH$_2$—X

R—O—CH$_2$—CH$_2$—O—CH$_2$—CH$_2$—O—CH$_2$—CH$_2$X

R—O—CH$_2$—CH(CH$_3$)OCH(CH$_3$)CH$_2$X

R—O—CH$_2$—CH(OH)CH$_2$—OH

R—O—CH$_2$CO—CH$_3$

R—O—CH$_2$CH$_2$OOC—CH$_3$ (R—O—CH$_2$CH$_2$—OCH$_2$CH$_2$)$_2$S

R—O—CH$_2$CH$_2$—SCH$_2$CH$_2$—O—C$_6$H$_5$

R—O—CH$_2$CH$_2$—SO$_2$—CH$_2$CH$_2$—O—CH$_2$CH$_2$X

In the foregoing formulas R and X have the values given above. R may be a simple benzene or naphthalene group or a more highly condensed ring system such as anthracene, phenanthrene, carbazole, etc., and may contain, in addition to one or more sulfonic acid groups, other inert substitutents such as alkyl, aralkyl, cycloalkyl, aryl, hydroxy, alkoxy groups or halogen. Those compounds in which R is a benzene ring carrying an alkyl group having from 4 to 18 carbon atoms or a cycloaliphatic group having 10 or more carbon atoms form particularly effective capillary-active materials when condensed with an aldehyde.

The sulfonated aromatic ethers which are used as starting materials for the present invention may be prepared by any desired process. They are conveniently prepared by the processes disclosed in the copending applications of Herman A, Bruson, Ser. No. 118,267 filed December 30, 1936; Ser. No. 120,180 filed January 12, 1937; Ser. No. 86,344 filed June 20, 1936; and in U. S. Patent No. 2,097,441, granted November 2, 1937.

The condensation of the aldehyde and any of the above types of sulfonic acid derivative is preferably carried out in the presence of sulfuric acid. The relative proportions of aldehyde and sulfonic derivative may be varied over a considerable range. It is preferable to use one mol of aldehyde for each two aromatic nuclei irrespective of whether the compound being treated contains one or more such nuclei. Thus, if there is one benzene ring in the sulfonated aromatic ether, two mols of ether will be reacted with one mol of aldehyde. If the ether contains two such nuclei, then it may be reacted with either one-half mol or one mol of the aldehyde. In this condensation part of the sulfonated aromatic ether may be replaced by an equivalent amount of another aromatic compound capable of condensing with the aldehyde such as a sulfonated aromatic hydrocarbon, a mono- or poly-hydroxy aromatic compound of the phenol class, a sulfonated halogenated aromatic hydrocarbon or a second sulfonated aromatic ether of one of the types described above. In this manner mixed condensation products can be obtained all of which are soluble in water. The final products may all be neutralized with bases, organic or inorganic, and most of the salts thus formed are soluble in water.

All of the compounds prepared according to the present invention are soluble in water and are powerful peptizing and dispersing agents. They are useful for preparing dispersions of dyes, pigments, sulfur, zinc oxide, etc.; for preparing emulsions; as textile assistants in dyeing and mercerizing operations; as wetting agents in alkaline media; as tanning agents; as moth-proofing agents and as detergents.

The invention is illustrated by the following examples but it is not limited to the exact materials and conditions of operation shown as it may otherwise be practiced within the scope of the appended claims.

Example 1

125 g. of p-ter.octyl phenoxy ethanol was stirred while 125 g. of 98% sulfuric acid was added dropwise, allowing the temperature to rise to 60° C. The cherry red mixture was stirred one hour, during which the temperature fell to 37° C. Paraformaldehyde (7.5 g.) was added in small portions during one hour at about 30° C., and the mixture stirred one-half hour. 200 cc. of water was added while cooling below 30° C., and the solution neutralized with 238 cc. of 25% sodium hydroxide. The turbid solution was cooled at 5° C. overnight and filtered from 160 g. sodium sulfate crystals. The clear filtrate (548 g.) contained 35% solids. It was found to be a powerful wetting and penetrating agent for textile materials, and excellent for the dispersion of pigments and carbon particles.

The solution may be dried to a pale yellow powder by evaporation of the solvent. It is equally effective for wetting and penetration and, moreover, may be incorporated into dry mixtures as a dispersing agent. Its active component is the formaldehyde condensation product of

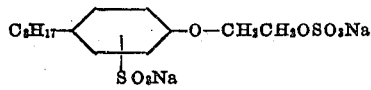

Example 2

55 g. of bornyl phenoxy ethanol, $$C_{10}H_{17}—C_6H_4OCH_2CH_2OH$$

was stirred while 50 g. of 98% sulfuric acid was added slowly. The temperature rose from 24° to about 65° C. The cherry red mixture was stirred and heated on the water bath one hour at about 60° C. Paraformaldehyde (3 g.) was added in several portions over a period of one-half hour at about 30° C. The deep red mixture was so viscous that it had to be heated up to 40° to permit stirring. 80 cc. of water was added to the mixture, followed by 100 cc. of 25% sodium hydroxide solution. The clear, red neutral solution was cooled to about 5° to 8° C. and filtered to remove insoluble matter. The clear, dark red filtrate contained 37% solids. It is a useful dispersing agent for pigments.

Example 3

70 g. of dodecyl phenoxy ethanol, $$C_{12}H_{25}—C_6H_4—OCH_2CH_2OH$$

was stirred while 50 g. of 98% sulfuric acid was added at about 25° C. The temperature rose to about 60° C. The brown mixture was heated on the water bath and stirred for one hour at 60° C. 3 g. of paraformaldehyde was added in portions to the pink mixture during one hour at a temperature below 30° C., and the viscous red paste stirred an hour longer at room temperature. 100 cc. of water was added at about 20° to 35° C. and the pink solution neutralized at a temperature below 30° C. with 97 cc. of 25% sodium hydroxide solution. The turbid white solution was cooled to approximately 5° C., allowed to stand overnight at this temperature and filtered from 86 g. of gummy residue. The turbid yellow filtrate contained 34% solids. It has powerful dispersing properties for pigments. Its active ingredient is the formaldehyde condensation product of

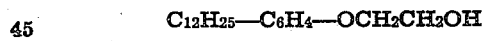

Example 4

72.5 g. of hexadecyl phenoxy ethanol, $$C_{16}H_{33}—C_6H_4—OCH_2CH_2OH$$

was melted and stirred while 50 g. of 98% sulfuric acid was added, the temperature rising from 40° to about 60° C. The clear, red oil was heated and stirred one hour at about 60° C. 3 g. of paraformaldehyde was added after cooling to 30° C. and the mixture stirred one hour. 80 cc. of water was added and the solution neutralized with 109 cc. of 25% sodium hydroxide solution whereupon a yellow paste formed.

The active ingredient of this product, the formaldehyde condensation product of

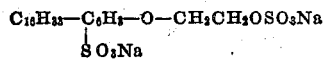

is an active dispersing and emulsifying agent.

In a similar manner, formaldehyde and sulfonated octadecylphenoxy-ethyl sulfuric acid ester gave a soapy product useful as a dispersing agent.

Example 5

125 g. of p-ter.octyl phenoxy ethanol $$C_8H_{17}—C_6H_4—O—CH_2CH_2OH$$

was stirred while 125 g. of 98% sulfuric acid was added over a period of about half an hour during which time the temperature rose from about 30° to 60° C. The red-brown mixture was stirred and heated 6 hours at about 55° to 65° to complete sulfonation. 7.5 g. of paraformaldehyde was added in small portions during one hour at about 25° to 30° C., and the deep red oil was stirred one hour longer. 500 cc. of water was added and the mixture heated on the steam bath to hydrolyze the sulfate ester group to a hydroxyl group, but leaving the aromatic sulfonic acid groups intact.

A portion of the solution was neutralized with solid potassium hydroxide, cooled to about 5° C., allowed to stand overnight at this temperature, and filtered from a small amount of residue. The clear, red filtrate had excellent penetrating action, even in strong alkaline solution.

The ammonium salt was prepared, as well as salts of amines such as methylamine, cyclohexylamine, morpholine, and ethanolamine, all of which are useful wetting and penetrating agents.

The active ingredients in these examples are the formaldehyde condensation products of the salts

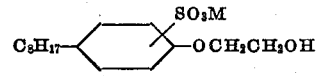

where M is potassium, ammonium, sodium, etc.

Example 6

125 g. of 98% sulfuric acid was added to 125 g. of p-ter.octyl phenoxy ethanol. The temperature rose from 30° to about 60° C. and the mixture was stirred and heated one hour at about 60° C. 51 g. of p-ter.octylphenol was added to the cherry-red mixture and stirring continued for 1½ hours more. 7.5 g. of paraformaldehyde was added in small portions during one hour, and the red mixture stirred one hour longer. Water was added to the red mixture below 35° C., and the solution neutralized with 232 cc. of 25% sodium hydroxide solution. The orange solution was cooled to 5° to 10° C., allowed to stand overnight, and filtered. The turbid brown filtrate, containing 31% solids, is a good dispersing agent.

Example 7

125 g. of 98% sulfuric acid was added to 125 g. of p-ter.octyl phenoxy ethanol, allowing the temperature to rise to about 60° C., and the red mixture was stirred one hour at this temperature. 12 g. of acetaldehyde was added, accompanied by a rise in temperature and deepening of color, and the mixture stirred one hour. 200 cc. of water was added, followed by 50 g. of solid caustic, and neutralization was completed with 87 cc. of 25% sodium hydroxide solution. The neutral solution was cooled to 5° to 10° C., allowed to stand overnight, and filtered. The filtrate was a clear, red solution containing 45% solids, which on drying yielded a brown solid having good dispersing and penetrating power when dissolved in water.

*Example 8*

125 g. of 98% sulfuric acid was added dropwise to 125 g. of p-ter.octyl phenoxy ethanol, accompanied by a temperature rise to about 60° C., and the deep red mixture stirred one hour. 32 g. of 2-ethyl hexylaldehyde was added and the brown mixture stirred one hour. 200 cc. of water was added, followed by 50 g. of solid sodium hydroxide while cooling. Neutralization was completed with 89 cc. of 25% sodium hydroxide solution. The neutral solution was cooled, allowed to stand overnight, and filtered. The clear, amber filtrate, when dried in vacuo, yielded a bright yellow paste containing 96% solids. Aqueous solutions of this material have good emulsifying properties.

*Example 9*

23 g. of 98% sulfuric acid was added to 42 g. of p-ter.octyl phenoxy ethoxy ethane, $$C_8H_{17}-C_6H_4-O-CH_2CH_2OCH_2CH_3$$

and the mixture stirred and heated six hours at 60° C. 2.25 g. of paraformaldehyde was added to the red mixture and stirred one hour at 30°-40° C. 60 cc. of water and then 1¼ g. of solid sodium hydroxide were added. Neutralization was completed with 7 cc. of 25% sodium hydroxide and the turbid orange solution cooled, allowed to stand overnight and filtered. The product was obtained as a turbid, orange filtrate containing 44% solids, the active component of which was the formaldehyde condensate of

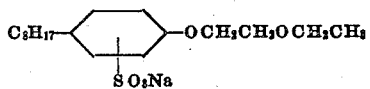

*Example 10*

75 g. of sulfuric acid was added to 156 g. of p-ter.octyl phenoxy ethoxy ethyl chloride, $$C_8H_{17}-C_6H_4-OC_2H_4OC_2H_4Cl$$

and the mixture stirred 6 hours at 60° C. 7.5 g. of paraformaldehyde was added over a period of one hour and the mixture was stirred and allowed to stand overnight. 200 cc. of water was added, followed by 40 g. of solid and 19 cc. of 25% sodium hydroxide. The neutral solution was cooled to 5°–10° C., allowed to stand overnight, and filtered. The product was a turbid, brown solution, containing 51% solids. The active principle was the formaldehyde condensation product of

*Example 11*

61 g. of chlorsulfonic acid was added to 156 g. of p-ter.octyl phenoxy ethoxy ethyl chloride at 5° to 15° C., and the mixture stirred three hours. 7.5 g. of paraformaldehyde was added and the mixture stirred three hours. The mixture was neutralized with 250 cc. of 10% sodium hydroxide solution and heated in an autoclave, together with 66 g. of sodium sulfite and 540 cc. of water for six hours at 180° to 190° C., to replace the chlorine atom by a sulfonic acid group

The product was evaporated to dryness and ground to a powder, the active ingredient of which was the formaldehyde condensation product of

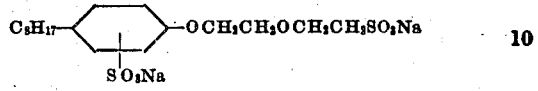

*Example 12*

20 g. of 98% sulfuric acid was added to 29.4 g. of β-phenoxy-β'-sec.octyloxy-diethyl ether, $$C_6H_5OC_2H_4OC_2H_4OC_8H_{17}$$

and the mixture heated and stirred five hours at about 60° to 70° C. The dark mixture was cooled to 25°, paraformaldehyde (1.5 g.) added, and the mixture stirred and allowed to stand overnight. 40 cc. of water was added and the brown solution neutralized with 47 cc. of 25% sodium hydroxide, cooled to 5° to 10° C., allowed to stand overnight, and filtered. The clear, brown filtrate contained 37% solids.

*Example 13*

20 g. of 98% sulfuric acid was added to 28.8 g. of β(β-naphthyl)-β'-butyl-diethyl ether, $$C_{10}H_7OC_2H_4OC_2H_4OC_4H_9$$

and the brown mixture stirred and heated five hours at about 60° C. Paraformaldehyde (1.5 g.) was added after cooling to about 30° C., and the mixture stirred one-half hour and allowed to stand overnight. Water was added and the red solution neutralized with 45 cc. of 25% sodium hydroxide solution, cooled to 5° to 10° C., allowed to stand overnight, and filtered. The clear, brown filtrate contained 36% solids, in which the active ingredient was the formaldehyde condensation product of $$NaO_3S-C_{10}H_6-OC_2H_4OC_2H_4OC_4H_9$$

*Example 14*

20 g. of 98% sulfuric acid was added to 29.2 g. of p-ter.octyl phenoxy ethyl acetate, $$C_8H_{17}-C_6H_4-OCH_2CH_2OOC-CH_3$$

and the red mixture stirred and heated five hours at 60° C. The mixture was cooled to 30° C. and 1.5 g. of paraformaldehyde added. The mixture was stirred for an hour, 40 cc. of water added, and the mixture neutralized with 44 cc. of 25% sodium hydroxide solution. The solution was cooled to 5° to 10° C., allowed to stand overnight and filtered. The clear, orange solution contained 38% solids.

*Example 15*

20 g. of 98% sulfuric acid was added to 29.5 g. of β-phenoxy-β'-(p-ter.octyl phenoxy)diethyl ether, $C_8H_{17}-C_6H_4-OC_2H_4OC_2H_4OC_6H_5$, and the resulting brown paste heated and stirred five hours at about 60° to 65° C. Paraformaldehyde (2.4 g.) was added and the viscous red mass allowed to stand overnight. It was heated to 40° C. and stirred. 30 cc. of water was added and the solution neutralized with 35 cc. of 25% sodium hydroxide. It was cooled, allowed to stand overnight, and filtered, yielding a turbid, orange solution.

Example 16

30 g. oleum (23%) was added to 37 g. of sym-di(ter.butyl phenoxy) di-ethyl ether,

and the red, viscous mass heated and stirred six hours at about 60° C. 1.5 g. of paraformaldehyde was added and the mixture stirred for three hours. 40 cc. of water was added, and the red solution neutralized with 59 cc. of 25% sodium hydroxide solution, cooled to 5° to 10° C., allowed to stand overnight, and filtered. The clear, red filtrate contained 42% solids.

Example 17

37 g. of 23% oleum was added to 89.2 g. of p-ter.octyl phenoxy ethoxy ethoxy ethyl chloride, $C_8H_{17}$—$C_6H_4$—$OC_2H_4OC_2H_4OC_2H_4Cl$, and the mixture heated six hours at approximately 60° C. 10.5 g. of aqueous 37% formaldehyde solution was added and the viscous mass stirred and allowed to stand overnight. 100 cc. of water was added and the solution neutralized by the addition of 20 g. of solid and 17 cc. of 25% aqueous sodium hydroxide. The neutral solution was cooled to 5° to 10° C., allowed to stand overnight, and filtered. The turbid, orange filtrate, when dried, formed a yellow paste. The active ingredient was the formaldehyde condensation product of

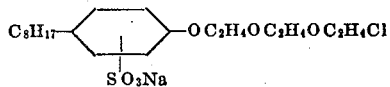

Variations in the herein disclosed process and in the foregoing examples may be made without departing from the invention. In place of the aromatic ethers specifically mentioned and their sulfonates others, such as those disclosed in the aforementioned Bruson applications, may be used. So also other bases, such as ammonia, the methylamines, cyclohexylamine, benzylamine, morpholine, the ethanolamines and others, may be used to neutralize the condensation product. If desired, some urea, guanidine, and other compounds capable of condensing with aldehydes may be aded prior or concurrently with the aldehyde so as to form joint condensation products. A desirable ratio of reactants when such additions are made is one molecular equivalent of urea or guanidine to two molecular equivalents each of formaldehyde and sulfonated aromatic ether.

We claim:

1. A process which comprises condensing in an acid medium an aldehyde and a sulfonate of an aromatic ether having the general formula R—O—A—X in which R is a sulfonated aromatic radical, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

2. A process which comprises condensing in an acid medium an aldehyde and a sulfonate of an aromatic ether having the general formula R—O—A—X in which R is a sulfonated aromatic radical containing as a nuclear substituent an alkyl radical having from 4 to 18 carbon atoms inclusive, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

3. A process which comprises condensing in an acid medium formaldehyde and a sulfonate of an aromatic ether having the general formula R—O—A—X in which R is a sulfonated aromatic radical containing as a nuclear substituent an alkyl radical having from 4 to 18 carbon atoms inclusive, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

4. A process which comprises condensing in an acid medium an aldehyde and a sulfonate of an aromatic ether having the general formula R—O—A—X in which R is a sulfonated benzene ring containing as a nuclear substituent an alkyl radical having from 4 to 18 carbon atoms inclusive, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

5. A process which comprises condensing in an acid medium an aldehyde and a sulfonate of an aromatic ether having the general formula R—O—A—X in which R is a sulfonated benzene ring containing as a nuclear substituent an alkyl radical having from 4 to 18 carbon atoms inclusive, A is a —$CH_2$—$CH_2$ group, and X is a member of the group consisting of hydroxyl, alkoxy, aryloxy, ester, sulfuric ester and sulfonic acid radicals and halogen.

6. A process which comprises condensing in an acid medium formaldehyde and a sulfonate of an aromatic ether having the general formula R—O—A—X in which R is a sulfonated benzene ring containing as a nuclear substituent an alkyl radical having from 4 to 18 carbon atoms inclusive, A is a —$CH_2$—$CH_2$ group, and X is a member of the group consisting of hydroxyl, alkoxy, aryloxy, ester, sulfuric ester and sulfonic acid radicals and halogen.

7. The product obtained by condensing an aldehyde and a sulfonate of an aromatic ether having the general formula R—O—A—X in which R is a sulfonated aromatic radical, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

8. The product obtained by condensing an aldehyde and a sulfonate of an aromatic ether having the general formula R—O—A—X in which R is a sulfonated aromatic radical containing as a nuclear substituent an alkyl radical having from 4 to 18 carbon atoms inclusive, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

9. The product obtained by condensing an aldehyde and a sulfonate of an aromatic ether having the general formula R—O—A—X in which R is a sulfonated benzene ring containing as a nuclear substituent an alkyl radical having from 4 to 18 carbon atoms inclusive, A is a divalent aliphatic radical containing at least two carbon atoms between X and the oxygen atom, and X is a member of the group consisting of hydroxyl, alkoxy, aryloxy, ester, sulfuric ester and sulfonic acid radicals and halogen.

10. The product obtained by condensing an aldehyde and a sulfonate of an aromatic ether having the general formula R—O—A—X in which R is a sulfonated benzene ring containing as a nuclear substituent an alkyl radical having from 4 to 18 carbon atoms inclusive, A is a —$CH_2$—$CH_2$ group, and X is a member of the group consisting of hydroxyl, alkoxy, aryloxy, ester, sulfuric ester and sulfonic acid radicals and halogen.

11. The product obtained by condensing formaldehyde and a sulfonate of an aromatic ether having the general formula R—O—A—X in which R is a sulfonated benzene ring containing as a nuclear substituent an alkyl radical having from 4 to 18 carbon atoms inclusive, A is a —$CH_2$—$CH_2$ group, and X is a member of the group consisting of hydroxyl, alkoxy, aryloxy, ester, sulfuric ester and sulfonic acid radicals and halogen.

12. The product obtained by condensing formaldehyde and a sulfonated p-ter.octyl phenoxy ethyl sulfuric acid ester.

HERMAN A. BRUSON.
CLINTON W. MacMULLEN.